(12) United States Patent
Endo et al.

(10) Patent No.: US 11,149,845 B2
(45) Date of Patent: Oct. 19, 2021

(54) DEVICE AND METHOD FOR CONTROLLING CONTINUOUSLY VARIABLE TRANSMISSION

(71) Applicants: JATCO Ltd, Fuji (JP); NISSAN MOTOR CO., LTD., Yokohama (JP)

(72) Inventors: Yasuhiro Endo, Isehara (JP); Akihiro Tanabe, Atsugi (JP); Takahiro Yamada, Ebina (JP); Shohei Imaji, Zama (JP); Masayuki Mannen, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/957,954

(22) PCT Filed: Dec. 13, 2018

(86) PCT No.: PCT/JP2018/045787
§ 371 (c)(1),
(2) Date: Jun. 25, 2020

(87) PCT Pub. No.: WO2019/131154
PCT Pub. Date: Jul. 4, 2019

(65) Prior Publication Data
US 2021/0062914 A1   Mar. 4, 2021

(30) Foreign Application Priority Data
Dec. 28, 2017 (JP) .............................. JP2017-254371

(51) Int. Cl.
*F16H 61/14* (2006.01)
*F16H 59/14* (2006.01)
*F16H 59/46* (2006.01)
*F16H 59/68* (2006.01)
*F16H 61/662* (2006.01)
*F16H 61/66* (2006.01)

(52) U.S. Cl.
CPC ......... *F16H 61/143* (2013.01); *F16H 59/141* (2013.01); *F16H 59/46* (2013.01);
(Continued)

(58) Field of Classification Search
CPC ........ F16H 59/141; F16H 59/46; F16H 59/68; F16H 2059/6807; F16H 61/143;
(Continued)

(56) References Cited

U.S. PATENT DOCUMENTS 5,231,898 A * 8/1993 Okura ................... F16H 61/061
477/95
5,755,638 A * 5/1998 Suzuki ................. F16H 61/143
192/3.3
(Continued)

FOREIGN PATENT DOCUMENTS

JP   2006-118675 A   5/2006
JP   2009-108955 A   5/2009
(Continued)

*Primary Examiner* — Edwin A Young
(74) *Attorney, Agent, or Firm* — Foley & Lardner LLP

(57) ABSTRACT

A continuously variable transmission (2) has a torque convertor (3) having a lock-up clutch (30) and a continuously variable transmission mechanism (5). A control unit (10) has a shift control unit (10C) configured to be able to perform a pseudo stepwise up-shift control that varies a transmission ratio of the continuously variable transmission mechanism (5) stepwise, a lock-up control unit (10A) configured to control an engagement state of the lock-up clutch (30), and a torque control command unit (10D) configured to perform a torque-down control of a driving source (1). When the engagement control of the lock-up clutch (30) and the pseudo stepwise up-shift control are performed at the same time, the torque control command unit (10D) configured to perform the torque-down control with a greater torque reduction amount.

5 Claims, 3 Drawing Sheets

(52) U.S. Cl.
CPC ........... *F16H 59/68* (2013.01); *F16H 61/662* (2013.01); *F16H 2059/6807* (2013.01); *F16H 2061/6615* (2013.01)

(58) Field of Classification Search
CPC ............. F16H 61/662; F16H 2061/146; F16H 2061/6615; B60W 10/026; B60W 10/04; B60W 10/107; B60W 30/19
See application file for complete search history.

(56) References Cited

U.S. PATENT DOCUMENTS

| | | | |
|---|---|---|---|
| 5,779,012 A | * | 7/1998 | Middelmann ........... F16H 45/02 192/3.3 |
| 2009/0239705 A1 | | 9/2009 | Tawara |
| 2010/0167871 A1 | * | 7/2010 | Inagaki ................. B60W 10/08 477/5 |
| 2010/0168969 A1 | | 7/2010 | Inagaki |
| 2010/0262346 A1 | | 10/2010 | Matsunaga |
| 2015/0369361 A1 | * | 12/2015 | Matsubara .............. F16H 59/44 477/169 |
| 2016/0185353 A1 | | 6/2016 | Honma |
| 2016/0347317 A1 | * | 12/2016 | Fukao ................. B60W 10/107 |
| 2019/0032778 A1 | | 1/2019 | Yamada et al. |

FOREIGN PATENT DOCUMENTS

| | | |
|---|---|---|
| JP | 2009-228763 A | 10/2009 |
| JP | 2010-156377 A | 7/2010 |
| JP | 2015-034595 A | 2/2015 |
| WO | WO-2017/135205 A1 | 8/2017 |

* cited by examiner

DEVICE AND METHOD FOR CONTROLLING CONTINUOUSLY VARIABLE TRANSMISSION

The present invention relates to a control device and a control method of a continuously variable transmission, which are suitable for a vehicle.

BACKGROUND ART

There is known a continuously variable transmission whose continuously variable transmission mechanism is connected to an output side of a power source such as an engine mounted in a vehicle through a torque convertor having a lock-up clutch. A technique of generating a shift feeling, like a stepwise variable transmission (or a multi-range transmission), by performing a step shift (a pseudo stepwise shift) that varies a transmission ratio stepwise by imitating a stepwise shift or a gear shift in such a continuously variable transmission is disclosed in, for instance, Patent Document 1.

In a case of this technique of the Patent Document 1, when changing torque of the power source in order to reduce a shock caused by an inertial force of the power source due to the step shift, an engagement state/a disengagement state of the lock-up clutch at a time when the step shift is started is maintained until the step shift is ended. With this, while avoiding an occurrence of an incompatibility state between an engagement/disengagement control of the lock-up clutch and a control for changing the torque of the power source in order to reduce the shock caused by the inertial force of the power source due to the step shift, the shock due to the step shift of the continuously variable transmission is suppressed.

Here, to increase fuel economy, for instance, reduction in power transmission loss of the lock-up clutch by engaging (fully engaging) the lock-up clutch is effective. However, upon start of the step shift, when maintaining the engagement state/the disengagement state of the lock-up clutch at the time of this start until the step shift is ended, like the technique of the Patent Document 1, if the lock-up clutch is in the disengagement state or a slip-engagement state, the power transmission loss necessarily occurs.

On the other hand, when engaging the lock-up clutch from the slip-engagement state upon acceleration for example, if the torque of the power source is large, durability of a facing of the lock-up clutch degrades.

Thus, reducing the torque of the power source when engaging the lock-up clutch is conceivable. However, if this reduction is performed during the acceleration, a driver is subjected to an odd or awkward feeling.

The present invention was made in view of such problems. An object of the present invention is therefore to provide a control device of a continuously variable transmission whose continuously variable transmission mechanism is connected to a driving source through a torque convertor having a lock-up clutch, which can perform an up-shift by a pseudo stepwise shift control of a transmission ratio and which is capable of quickly engaging the lock-up clutch while performing a control that suppresses degradation in durability of the lock-up clutch without giving a driver the odd or awkward feeling.

CITATION LIST

Patent Document

Patent Document 1 Japanese Unexamined Patent Application Publication No. 2006-118675

SUMMARY OF THE INVENTION (1) A control device of a continuously variable transmission according to the present invention is a control device that controls a continuously variable transmission whose continuously variable transmission mechanism is connected to a driving source through a torque convertor having a lock-up clutch. The control device comprises: a shift control unit configured to control a transmission ratio of the continuously variable transmission mechanism and to be able to perform a pseudo stepwise up-shift control that varies the transmission ratio stepwise when performing an up-shift; a lock-up control unit configured to control an engagement state of the lock-up clutch; and a torque control command unit configured to, when an engagement control that brings the lock-up clutch to a full engagement state by the lock-up control unit and the pseudo stepwise up-shift control by the shift control unit are performed at the same time, perform an engagement interlocking torque-down control that reduces a torque of the driving source in conjunction with these engagement control and pseudo stepwise up-shift control.

(2) It is preferable that the torque control command unit is configured to, when the pseudo stepwise up-shift control is performed, perform an inertia change-response torque-down control of the driving source according to an amount of an inertia change due to the up-shift, and a torque reduction amount of the engagement interlocking torque-down control is greater than a torque reduction amount of the inertia change-response torque-down control.

(3) It is preferable that the lock-up control unit is configured to start the engagement control of the lock-up clutch on condition that an, input and output rotation speed difference of the lock-up clutch is within a predetermined rotation speed difference, and as the engagement control, to perform a ramp control that increases an engagement pressure of the lock-up clutch at a normal increase rate, and a condition that the engagement control by the lock-up control unit and the pseudo stepwise up-shift control by the shift control unit are performed at the same time is set as a control condition, and when this condition is satisfied, the ramp control is performed at a rapid increase rate that is greater than the normal increase rate.

(4) It is preferable that the lock-up control unit is configured to set the rapid increase rate according to a progress state of the pseudo stepwise up-shift control and the input and output rotation speed difference of the lock-up clutch at a start of the engagement control of the lock-up clutch so that the engagement control is completed by the time the pseudo stepwise up-shift control is completed.

(5) It is preferable that in a case where although the pseudo stepwise up-shift control is completed, the engagement control of the lock-up clutch is not completed yet, the lock-up control unit is configured to continue the engagement control with an increase rate returned from the rapid increase rate to the normal increase rate.

(6) It is preferable that the lock-up control unit is configured to judge that the pseudo stepwise up-shift control is completed by a fact that an output rotation speed of the lock-up clutch increases, also judge that the engagement control of the lock-up clutch is not completed yet by a fact that the input and output rotation speed difference of the lock-up clutch is a predetermined slight rotation speed difference or more.

According to the present invention, when the engagement control that brings the lock-up clutch to the full engagement and the pseudo stepwise up-shift control are performed at the same time, the engagement interlocking torque-down control that is a control reducing the torque of the driving source is performed. Therefore, thanks to the reduction of the torque of the driving source, it is possible to quickly complete the engagement control of the lock-up clutch without applying an excessive load to the lock-up clutch. Further, since the torque of the driving source is reduced during execution of the pseudo stepwise up-shift control, the driver hardly feels the odd or awkward feeling caused by the torque reduction.

Moreover, the condition that the engagement control that brings the lock-up clutch to the full engagement state and the pseudo stepwise up-shift control are performed at the same time is set as a control condition, and when this condition is satisfied, in the engagement control, the ramp control is performed at the rapid increase rate that is greater than the normal increase rate. With this ramp control, it is possible to complete the engagement control more quickly, and this helps completion of the engagement control during execution of the pseudo stepwise up-shift control.

EMBODIMENTS FOR CARRYING OUT THE INVENTION

In the following description, an embodiment of the present invention will be explained with reference to the drawings. The embodiment is an example of the present invention, and this does not exclude various modifications and techniques which are not indicated in the embodiment. A configuration of the embodiment could be realized also by being modified, combined with others, deleted or selected, as necessary.

Regarding each rotation speed, it is also described as the number of revolutions (rpm: revolutions per minute).

[Configuration of Driveline of Vehicle]
First, a driveline of a vehicle mounting therein a continuously variable transmission for the vehicle and its control device according to the present embodiment will be explained.

Figure 1:
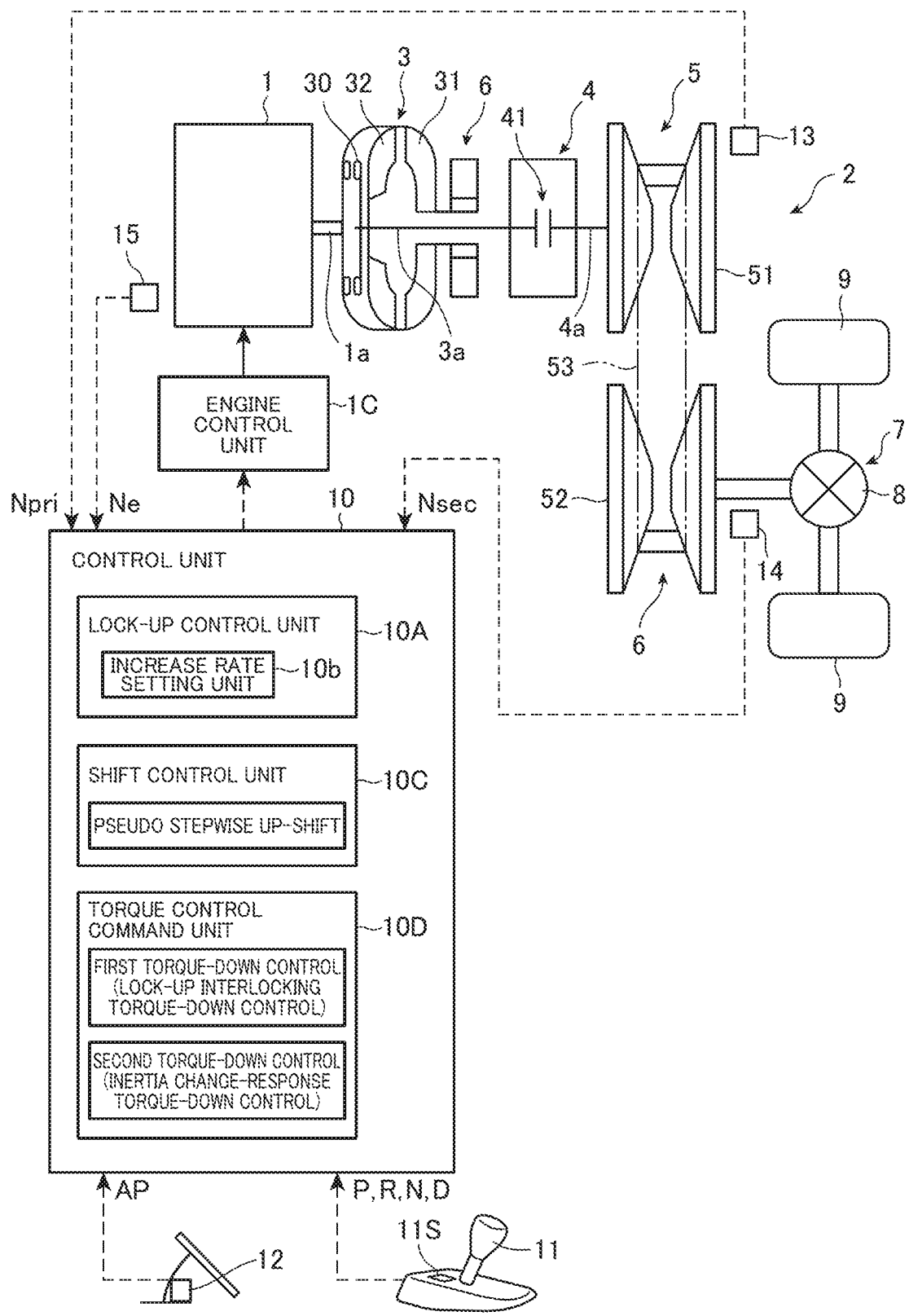
FIG. 1 is a configuration showing a continuously variable transmission and its control device according to an embodiment of the present invention.

As shown in FIG. 1, the driveline of the vehicle has an engine (an internal combustion engine) 1 as a driving source, a continuously variable transmission for the vehicle (also, simply called a continuously variable transmission) 2 that varies an output rotation (an output rotation speed) of the engine 1 and a power transmission unit 7 that transmits an output rotation of the continuously variable transmission 2 to driving wheels 9, 9. The power transmission unit 7 has a differential gear 8.

The continuously variable transmission 2 is configured as a continuously variable transmission (CVT) having a torque convertor 3 that is connected to an output shaft 1a of the engine 1, a forward-reverse switching mechanism 4 that is connected to an output shaft 3a of the torque convertor 3 and a belt-type continuously variable transmission mechanism (a variator) 5 that is connected to an output shaft 4a of the forward-reverse switching mechanism 4. The torque convertor 3 is provided with an oil pump 6.

The torque convertor 3 has a pump impeller 31 that is connected to the output shaft 1a of the engine 1 and connected to the oil pump 6 for drive, a turbine runner 32 that is connected to an input side of the forward-reverse switching mechanism 4 and a lock-up clutch 30 that can fixedly connect these pump impeller 31 and turbine runner 32.

The forward-reverse switching mechanism 4 is formed by a planetary gear mechanism (not shown) and a plurality of frictional engagement elements 41. The forward-reverse switching mechanism 4 switches a forward movement and a reverse movement by an engagement state of the frictional engagement elements 41.

The variator 5 has a primary pulley 51 that is connected to the output side of the forward-reverse switching mechanism 4, a secondary pulley 52 that is connected to the driving wheels 9, 9 for drive and a belt 53 that is wound around both of the primary pulley 51 and the secondary pulley 52 and transmits power.

[Control Device of Continuously Variable Transmission]
To control the continuously variable transmission 2, a control unit (a control means) 10 is provided.

This control unit 10 reads a range position signal (the range position signal is hereinafter described as P-range, R-range, N-range or D-range) from a shift lever 11 that selects a range position by driver's operation, an accelerator opening signal (an accelerator opening) AP from an accelerator opening sensor 12, a primary rotation speed signal Npri from a primary pulley rotation speed sensor 13 that detects a rotation speed of the primary pulley 51, a secondary rotation speed signal Nsec from a secondary pulley rotation speed sensor 14 that detects a rotation speed of the secondary pulley 52 and an engine rotation speed signal Ne from an engine rotation speed sensor 15 that detects a rotation speed of the engine 1. Here, in a case of D-range, since the rotation speed of the primary pulley is equal to a turbine rotation speed by an engagement of a forward clutch of the frictional engagement elements 41, the primary rotation speed signal Npri is hereinafter also called a turbine rotation speed Nt.

The control unit 10 has, as functional elements, a lock-up control unit (a lock-up control section or a lock-up control means) 10A that controls an engagement state of the lock-up clutch 30, a shift control unit (a shift control section or a shift control means) 10C that controls the variator 5, a torque control command unit (a torque control command section or a torque control command means) 10D that gives a control command relating to torque of the engine 1 and a forward-reverse control unit (not shown) that controls the forward-reverse switching mechanism 4. The control unit 10 further has a function of calculating a vehicle speed VSP on the basis of the secondary rotation speed Nsec. In addition, a shift map by which an optimum fuel economy state can be achieved according to a vehicle travelling condition is stored in the control unit 10.

The lock-up control unit 10A engages the lock-up clutch 30 when a predetermined lock-up condition relating to the vehicle travelling condition is satisfied during travel of the vehicle. Although this engagement includes a full engagement (called an engagement or a lock-up) and a slip engagement the control according to the present invention is connected with the full engagement of the lock-up clutch 30. Regarding the engagement control to engage the lock-up clutch 30, by a ramp control that engages the lock-up clutch 30 by ramping up (gradually increasing) an engagement pressure (here, an oil pressure) of the lock-up clutch 30, an engagement shock can be avoided. The lock-up control unit 10A has an increase rate setting unit 10b that sets an increase rate (an increase rate of the engagement pressure) relating to this ramp control.

The shift control unit 10C sets a target transmission ratio (corresponding to an after-mentioned normal transmission ratio) of the variator 5 from the accelerator opening AP and the vehicle speed VSP according to the shift map. Then, an oil pressure of each pulley is controlled by a feed-forward control on the basis of the target transmission ratio, an actual transmission ratio is detected on the basis of the primary rotation speed signal Npri and the secondary rotation speed signal Nsec, and the oil pressure of each pulley is feedback-controlled so that the set target transmission ratio and the actual transmission ratio become equal to each other.

As shift modes relating to an up-shift by the shift control unit 10C, in addition to normal up-shift modes such as an auto-up-shift by acceleration, a foot back up-shift and a foot release up-shift, a pseudo stepwise up-shift mode is provided. These shift modes are selected according to a load of the engine 1, an engine rotation speed (hereinafter, also called the number of revolutions of the engine) Ne, the accelerator opening AP, a rate of change DAP of the accelerator opening, the vehicle speed etc.

The pseudo stepwise up-shift mode is a mode in which a step shift (a pseudo stepwise shift) that varies the transmission ratio stepwise by imitating a stepwise shift or a gear shift is performed. A switch 11S to select this pseudo stepwise shift mode is provided at a position close to the shift lever 11. The pseudo stepwise up-shift mode is carried out when this mode is selected by the switch 11S and the vehicle accelerates by an accelerator pedal depression operation, instead of performing the auto-up-shift by which the transmission ratio is varied smoothly.

The torque control command unit 10D outputs a command signal to an engine control unit 1C, which controls the engine 1, so as to reduce the torque outputted from the engine 1 upon execution of the pseudo stepwise up-shift. This control (a torque-down control) to reduce the torque includes a first torque-down control that is performed in conjunction with (or in synchronization with) the engagement control of the lock-up clutch 30 and the pseudo stepwise up-shift control in a case where the pseudo stepwise up-shift control is executed simultaneously with (or concurrently with) the engagement control of the lock-up clutch 30 and a second torque-down control that is performed in a case where the engagement control of the lock-up clutch 30 is not executed but the pseudo stepwise up-shift control is executed. The torque control command unit 10D outputs a first torque-down command by which the first torque-down control is performed or a second torque-down command by which the second torque-down control is performed according to each condition.

[Lock-Up Control, Pseudo Stepwise Up-Shift Control and Torque-Down Control]

The lock-up control (the engagement control), the pseudo stepwise up-shift control and the torque-down control will be explained in detail below.

[Lock-Up Control]

When starting the vehicle and when rapidly accelerating the vehicle, power is transmitted using the torque convertor 3 without engaging the lock-up clutch 30. However, if the lock-up clutch 30 is engaged as much as possible, a power transmission loss is suppressed and the fuel economy can be increased.

Therefore, when the predetermined lock-up condition relating to the vehicle travelling condition is satisfied, the lock-up control unit 10A brings the lock-up clutch 30 to an engagement state.

As mentioned above, when engaging the lock-up clutch 30, the ramp control that gradually increases the engagement pressure is used. However, if the ramp control is started from a state in which a difference between input and output rotation speeds of the lock-up clutch 30 is large, it is difficult to avoid the engagement shock, or it takes time to engage the lock-up clutch 30, which consequently develops wear of a facing of the lock-up clutch 30. Because of this, as the lock-up condition when starting this ramp control, a condition that the input and output rotation speed difference of the lock-up clutch 30 is within a predetermined rotation speed difference is provided. Here, the predetermined rotation speed difference could be a constant value, or may be changed according to the output torque of the engine 1.

When using the ramp control, the lock-up control unit 10A sets an increase rate of the engagement pressure by the increase rate setting unit 10b. The increase rate setting unit 10b selectively sets a normal increase rate used at a normal operation (an operation except execution of the pseudo stepwise up-shift) and a rapid increase rate, which is greater than the normal increase rate, used when the pseudo stepwise up-shift is executed. The normal increase rate is constant values set for each accelerator opening, whereas the rapid increase rate is not a constant value. The rapid increase rate is set according to a progress state of the pseudo stepwise up-shift control and the input and output rotation speed difference of the lock-up clutch 30 at a start of the engagement control of the lock-up clutch 30 so that the engagement control of the lock-up clutch 30 is completed by the time the pseudo stepwise up-shift control is completed.

The reason why the rapid increase rate, which is greater than the normal increase rate, is used when executing the pseudo stepwise up-shift is because it is required to complete the engagement control of the lock-up clutch 30 by the time the pseudo stepwise up-shift is completed. Therefore, when changing the increase rate from the normal increase rate to the rapid increase rate upon start of the pseudo stepwise up-shift, as the input and output rotation speed difference of the lock-up clutch 30 at that time is larger, the rapid increase rate is set to a greater value. However, if the increase rate is too great, the engagement shock of the lock-up clutch 30 is large. Thus, an upper limit is set on the rapid increase rate.

It is noted that in a case where although the pseudo stepwise up-shift control is completed, the engagement control of the lock-up clutch 30 is not completed yet, the lock-up control unit 10A continues the engagement control of the lock-up clutch 30 with the increase rate returned from the rapid increase rate to the normal increase rate. At this time, the lock-up control unit 10A judges that the pseudo stepwise up-shift control is completed by the fact that the output rotation (the output rotation speed) of the lock-up clutch 30 increases, also judges that the engagement control of the lock-up clutch 30 is not completed by the fact that the input and output rotation speed difference of the lock-up clutch 30 is a predetermined slight rotation speed difference or more.

[Pseudo Stepwise Up-Shift Control]

Regarding the pseudo stepwise up-shift control, this control is performed so that the transmission ratio is varied stepwise to a higher speed side, like a stepwise variable transmission (or a multi-range transmission), according to the vehicle speed VSP and the load of the engine 1, and the vehicle speed is increased while repeating increase and rapid decrease of the rotation speed Ne of the engine 1.

In this pseudo stepwise up-shift mode, the vehicle speed is increased while repeating hold of the transmission ratio and a relatively rapid stepwise up-shift according to the accelerator opening AP detected by the accelerator opening sensor 12, the rate of change ΔAP of the accelerator opening etc. The hold of the transmission ratio mentioned here does not mean that a constant transmission ratio is completely held, but means that the transmission ratio is controlled so that, like the stepwise variable transmission (or the multi-range transmission), the increase in the vehicle speed and the increase in the engine rotation speed fit to or agree with a sense or feeling of the driver.

That is, if the transmission ratio is controlled according to an operating point that is determined by the vehicle speed VSP and the accelerator opening AP from the shift map, the transmission ratio is varied smoothly. However, in the pseudo stepwise up-shift mode, a state in which the transmission ratio is not greatly changed (the transmission ratio is not given a great change) is held for a certain period, and after that, the up-shift is carried out with the transmission ratio greatly changed. The transmission ratio then varies stepwise. Here, the period for which the transmission ratio is not greatly changed (or the transmission ratio is held) is a time period from a time point when the pseudo stepwise up-shift mode is selected or from a time point of an end of the up-shift to a time point when an actual primary rotation speed reaches a predetermined up-shift start rotation speed (the number of revolutions for the up-shift start).

[Torque-Down Control]

As the torque-down control, the first torque-down control and the second torque-down control are provided, and either of these first and second torque-down controls is performed when executing the pseudo stepwise up-shift. Since the first torque-down control is performed in the case where the pseudo stepwise up-shift control is executed simultaneously with (or concurrently with) the engagement control of the lock-up clutch 30, the first torque-down control is also called a lock-up interlocking torque-down control. Since the second torque-down control is performed exclusively in order to cancel an inertia change at an input side due to the up-shift, the second torque-down control is also called an inertia change-response torque-down control. Although there are some torque-down methods such as reduction in throttle opening, reduction in fuel injection amount and retardation of ignition timing, any of them can be used.

In the first torque-down control, the torque-down of the engine is carried out with a greater torque-down amount than that of the second torque-down control. This is because the first torque-down control is aimed at, in addition to cancel of the inertia change at the input side due to the up-shift, quickly completing the engagement of the lock-up clutch 30 before the completion of the pseudo stepwise up-shift.

Further, in these first torque-down control and second torque-down control, the torque-down is periodically carried out at each predetermined reduction degree, and when the torque-down of a predetermined amount is attained, the torque is periodically increased at each predetermined increase degree and returned to an initial torque, then each torque-down control is ended. Each of these torque-down controls is performed so that the torque-down control is completed before the completion of the pseudo stepwise up-shift control.

As explained above, when the engagement control of the lock-up clutch 30 is performed using the ramp control and the pseudo stepwise up-shift is performed simultaneously with (or concurrently with) this engagement control, the ramp control is performed using the rapid increase rate that is greater than the normal increase rate. When performing the ramp control using the rapid increase rate, an engagement load applied to the lock-up clutch 30 also becomes large. Therefore, at this time, by increasing the torque-down amount by the first torque-down control, the engine torque is reduced more, then the load applied to the lock-up clutch 30 is lightened.

[Operation and Effect]

Figure 2:
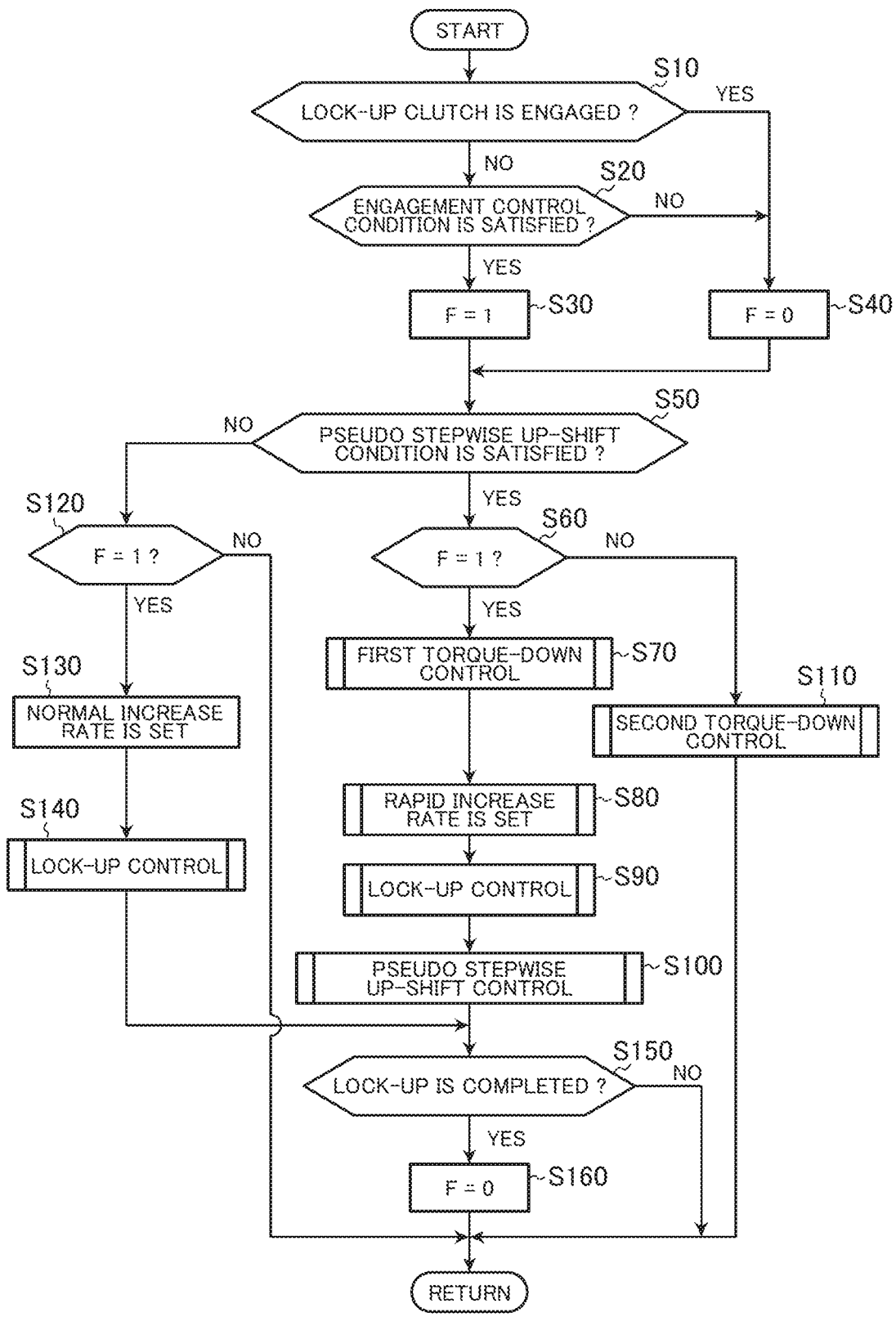
FIG. 2 is a flow chart explaining a control by the control device of the continuously variable transmission according to the embodiment of the present invention.

The control device of the continuously variable transmission according to the embodiment of the present invention is configured as described above. Therefore, for instance, the above controls are performed as shown in a flow chart of FIG. 2. Here, F in FIG. 2 is a control flag that is "1" during execution of the engagement control of the lock-up clutch 30, and is "0" at a time except the execution of the engagement control of the lock-up clutch 30. Further, the flow chart of FIG. 2 is executed at a predetermined control interval. Moreover, this flow chart is carried out when the pseudo stepwise up-shift mode is established by the signal from the switch 11S.

As shown in FIG. 2, first, a judgment is made as to whether or not the lock-up clutch 30 is engaged (step S10). If judged that the lock-up clutch 30 is engaged, the flag F is set to 0 (step S40), and the routine proceeds to step S50.

On the other hand, if judged that the lock-up clutch 30 is not engaged, a judgment is made as to whether or not the engagement control condition of the lock-up clutch 30 is satisfied (step 320). If judged that the engagement control condition is satisfied, the flag F is set to 1 (step S30), and the routine proceeds to step S50. If judged that the engagement control condition is not satisfied, the flag F is set to 0 (step S40), and the routine proceeds to step S50.

At step S50, a judgment is made as to whether or not a state (hereinafter, called a pseudo stepwise up-shift condition) in which the pseudo stepwise up-shift is going to be executed is satisfied from the vehicle travelling condition (the vehicle speed VSP and the load of the engine 1 (e.g. the accelerator opening AP)). If judged that the pseudo stepwise up-shift condition is satisfied, a judgment is made as to whether or not the flag F is 1 (step S60).

If judged that the flag F is 1, the first torque-down control whose torque-down amount is greater is performed (step S70). Further, the rapid increase rate is set according to the progress state of the pseudo stepwise up-shift control and a decrease state of the input and output rotation speed difference of the lock-up clutch 30 (step S80). Then, the lock-up control (the engagement control) that engages the lock-up clutch 30 is performed by increasing the engagement pressure of the lock-up clutch 30 using this rapid increase rate (step S90). Subsequently, the pseudo stepwise up-shift control is executed (step S100). Further, a judgment is made as to whether or not the lock-up control is completed (step S150). If judged that the lock-up control is completed, the flag F is reset (the flag F is set to 0) (step S160).

As explained above, by engaging the lock-up clutch 30 by increasing the engagement pressure of the lock-up clutch 30 using the rapid increase rate while performing the first torque-down control whose torque-down amount is greater, it is possible to quickly complete the engagement of the lock-up clutch 30 by the time the pseudo stepwise up-shift control is completed while suppressing an increase in the engagement load of the lock-up clutch 30. Even though the first torque-down control whose torque-down amount is greater is performed during execution of the pseudo stepwise up-shift, and even though the lock-up clutch 30 is quickly engaged, the driver has a tendency not to feel these as an odd or awkward feeling. It is therefore possible to quickly engage the lock-up clutch 30 without impairing a driving feeling.

At step S60, if judged that the flag F is not 1, the second torque-down control whose torque-down amount is smaller is performed (step S110).

At step S50, if judged that the pseudo stepwise up-shift condition is not satisfied, a judgment is made as to whether or not the flag F is 1 (step S120).

If judged that the flag F is 1, the normal increase rate is set (step S130), and the lock-up control (the engagement control) that engages the lock-up clutch 30 is performed by increasing the engagement pressure of the lock-up clutch 30 using this normal increase rate (step S140). Further, a judgment is made as to whether or not the lock-up control is completed (step S150). If judged that the lock-up control is completed, the flag F is reset (the flag F is set to 0) (step S160).

At step S120, if judged that the flag F is not 1, all of the torque-down control, the lock-up control and the pseudo stepwise up-shift control are not performed.

Here, if the pseudo stepwise up-shift is completed before completion of the lock-up control, the pseudo stepwise up-shift condition is not satisfied. Thus, the routine proceeds from step S50 to step S120, and the lock-up control is performed using the normal increase rate (step S120 to step S140).

Figure 3:
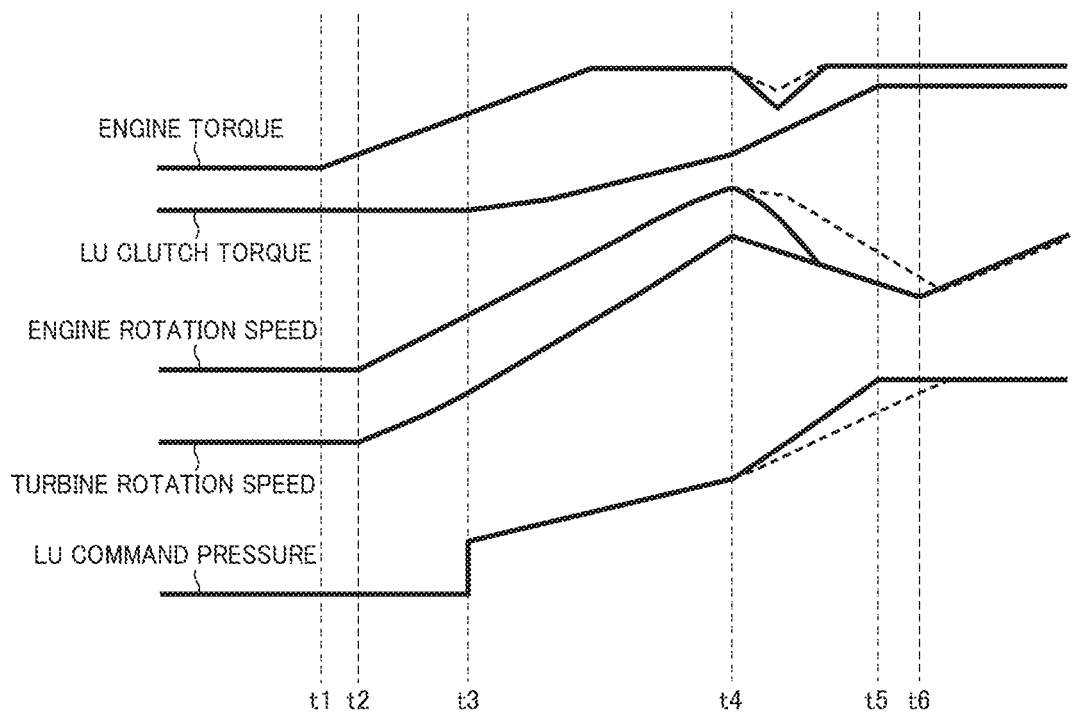
FIG. 3 is a time chart explaining the control by the control device of the continuously variable transmission according to the embodiment of the present invention.

Next, a specific example of the control by the control device according to the present invention will be explained with reference to a time chart shown in FIG. 3. An example shown in FIG. 3 is a case where the vehicle starts and accelerates. In FIG. 3, solid lines indicate the control by the control device according to the present invention, and broken lines indicate a comparative example that does not employ the control of the invention. LU is an abbreviation of lock-up. An LU command pressure is a control command value, and this is shown instead of a lock-up oil pressure (the engagement pressure).

As shown in FIG. 3, when an accelerator pedal is depressed at time t1, the engine torque rises. Subsequently, at time t2, the engine rotation speed rises, and the turbine rotation speed of the torque convertor 3 rises by and according to this rise of the engine rotation speed, then the vehicle starts.

When the lock-up condition is satisfied at time t3, the lock-up oil pressure (the engagement pressure) rises, and the lock-up oil pressure (the engagement pressure) is increased at the normal increase rate. With this, the slip engagement of the lock-up clutch 30 starts, and a clutch torque of the lock-up clutch 30 is gradually increased.

Subsequently, at time t4, when the vehicle travelling condition become the state in which the pseudo stepwise up-shift control is going to be executed, the pseudo stepwise up-shift control is started, and the transmission ratio is decreased stepwise.

At this time t4, at the same time, the first torque-down control is started. Also, at the same time, the increase rate of the lock-up oil pressure (the engagement pressure) is changed from the normal increase rate to the rapid increase rate that is greater than the normal increase rate.

With this, as can be seen by the solid lines after time t4, the lock-up clutch 30 is in the full engagement state (the engagement state) at time t5, and subsequently, the pseudo stepwise up-shift control is completed at time t6.

As mentioned above, the rapid increase rate is changed according to the progress state of the pseudo stepwise up-shift control and the decrease state of the input and output rotation speed difference of the lock-up clutch 30.

On the other hand, as can be seen by the broken lines after time t4, in a case where the second torque-down control whose torque-down amount is smaller is performed with the increase rate of the lock-up oil pressure (the engagement pressure) remaining unchanged at normal increase rate, it takes time to decrease the engine rotation speed, and also it takes time to increase the lock-up oil pressure (the engagement pressure). As a consequence, at time t6, although the pseudo stepwise up-shift control is completed, the full engagement (the engagement) of the lock-up clutch 30 is not completed.

As explained above, according to the control device of the present invention, in the case where the engagement control of the lock-up clutch 30 and the pseudo stepwise up-shift control are executed at the same time, the first torque-down control whose torque-down amount is greater is performed. Therefore, the engagement of the lock-up clutch 30 can be completed before the completion of the pseudo stepwise up-shift control. Hence, it is possible to engage the lock-up clutch 30 without giving the driver the odd or awkward feeling and impairing the driving feeling.

Especially in the present invention, a condition that the engagement control of the lock-up clutch and the pseudo stepwise up-shift control are executed at the same time is set as a control condition, and when this condition is satisfied, the ramp control is performed at the rapid increase rate that is greater than the normal increase rate. It is therefore possible to complete the engagement control more quickly, and this helps the completion of the engagement control during execution of the pseudo stepwise up-shift control.

Since the lock-up control is executed on condition that the input and output rotation speed difference of the lock-up clutch 30 is within the predetermined rotation speed difference, the load applied to the lock-up clutch 30 can be lightened.

Further, since the rapid increase rate is set according to the progress state of the pseudo stepwise up-shift control and the decrease state of the input and output rotation speed difference of the lock-up clutch 30 at the start of the engagement control of the lock-up clutch 30, it is possible to complete the engagement of the lock-up clutch 30 before the completion of the pseudo stepwise up-shift while suppressing an increase in the engagement pressure of the lock-up clutch 30. Especially if the control is performed so that the completion of the pseudo stepwise up-shift and the completion of the engagement of the lock-up clutch 30 are synchronized with each other, the odd or awkward feeling which the drive is subjected to can be even smaller.

Moreover, in the case where although the pseudo stepwise up-shift control is completed, the engagement control of the lock-up clutch 30 is not completed yet, the engagement control continues with the increase rate returned from the rapid increase rate to the normal increase rate. It is thus possible to suppress the engagement shock and the increase of the engagement load of the lock-up clutch 30. In this case, at least in next pseudo stepwise up-shift control (e.g. if the pseudo stepwise up-shift control from 1st speed to 2nd speed is performed this time, the next pseudo stepwise up-shift control is a control from 2nd speed to 3rd speed), the engagement control can be completed.

[Others]

Although the present invention is explained above, the present invention includes all design modifications and equivalents belonging to the technical scope of the present invention.

For instance, in the above embodiment, the engine 1 is described as the power source. However, for instance, an electric motor (a motor) can be used as the power source Further, in the above embodiment, the case where the engagement control of the lock-up clutch and the pseudo stepwise up-shift control are executed at the same time (or the pseudo stepwise up-shift control is executed simultaneously with (or concurrently with) the engagement control of the lock-up clutch) is explained. Here, "at the same time", "simultaneously" and "concurrently with" do not necessarily mean that the two controls, i.e. the engagement control of the lock-up clutch and the pseudo stepwise up-shift control, completely coincide with each other from a start to an end of each control, but mean that, for instance, at least a part of the engagement control and a part of the pseudo stepwise up-shift control overlap each other in terms of time.

Furthermore, in the above embodiment, although the rapid increase rate is set according to the progress state of the pseudo stepwise up-shift control and the decrease state of the input and output rotation speed difference of the lock-up clutch at the start of the engagement control of the lock-up clutch, when the rapid increase rate is greater than the normal increase rate, the effect is produced. For instance, the rapid increase rate could be a fixed value that is greater than the normal increase rate and is set for each accelerator opening.

The invention claimed is:

1. A control device of a continuously variable transmission, controlling the continuously variable transmission whose continuously variable transmission mechanism is connected to a driving source through a torque convertor having a lock-up clutch, the control device comprising:
   a shift control unit configured to control a transmission ratio of the continuously variable transmission mechanism and to be able to perform a pseudo stepwise up-shift control that varies the transmission ratio stepwise when performing an up-shift;
   a lock-up control unit configured to control an engagement state of the lock-up clutch; and
   a torque control command unit configured to, when an engagement control that brings the lock-up clutch to a full engagement state by the lock-up control unit and the pseudo stepwise up-shift control by the shift control unit are performed at the same time, perform an engagement interlocking torque-down control that reduces a torque of the driving source in conjunction with these engagement control and pseudo stepwise up-shift control, and wherein
   the lock-up control unit is configured to start the engagement control of the lock-up clutch on condition that an input and output rotation speed difference of the lock-up clutch is within a predetermined rotation speed difference, and as the engagement control, to perform a ramp control that increases an engagement pressure of the lock-up clutch at a normal increase rate,
   a condition that the engagement control by the lock-up control unit and the pseudo stepwise up-shift control by the shift control unit are performed at the same time is set as a control condition, and when this condition is satisfied, the ramp control is performed at a rapid increase rate that is greater than the normal increase rate, and
   in a case where although the pseudo stepwise up-shift control is completed, the engagement control of the lock-up clutch is not completed yet, the lock-up control unit is configured to continue the engagement control with an increase rate returned from the rapid increase rate to the normal increase rate.

2. The control device of the continuously variable transmission as claimed in claim 1, wherein:
   the torque control command unit is configured to, when the pseudo stepwise up-shift control is performed, perform an inertia change-response torque-down control of the driving source according to an amount of an inertia change due to the up-shift, and
   a torque reduction amount of the engagement interlocking torque-down control is greater than a torque reduction amount of the inertia change-response torque-down control.

3. The control device of the continuously variable transmission as claimed in claim 1, wherein:
   the lock-up control unit is configured to set the rapid increase rate according to a progress state of the pseudo stepwise up-shift control and the input and output rotation speed difference of the lock-up clutch at a start of the engagement control of the lock-up clutch so that the engagement control is completed by the time the pseudo stepwise up-shift control is completed.

4. The control device of the continuously variable transmission as claimed in claim 1 wherein:
   the lock-up control unit is configured to judge that the pseudo stepwise up-shift control is completed by a fact that an output rotation speed of the lock-up clutch increases, also judge that the engagement control of the lock-up clutch is not completed yet by a fact that the input and output rotation speed difference of the lock-up clutch is a predetermined slight rotation speed difference or more.

5. A method of controlling a continuously variable transmission whose continuously variable transmission mechanism is connected to a driving source through a torque convertor having a lock-up clutch, the method comprising:
   performing a pseudo stepwise up-shift control that varies a transmission ratio of the continuously variable transmission mechanism stepwise when performing an up-shift upon selection of a pseudo stepwise up-shift mode;
   performing an engagement control that brings the lock-up clutch to a full engagement state when a predetermined lock-up condition is satisfied;
   when the pseudo stepwise up-shift control and the engagement control of the lock-up clutch are performed at the same time, performing a first torque-down control of the driving source in conjunction with these engagement control and pseudo stepwise up-shift control;
   when the pseudo stepwise up-shift control is performed without performing the engagement control of the lock-up clutch, performing a second torque-down control of the driving source;
   setting a torque reduction amount of the first torque-down control to be greater than a torque reduction amount of the second torque-down control;
   starting the engagement control of the lock-up clutch on condition that an input and output rotation speed difference of the lock-up clutch is within a predetermined rotation speed difference, and as the engagement control, performing a ramp control that increases an engagement pressure of the lock-up clutch at a normal increase rate;

setting, as a control condition, a condition that the engagement control and the pseudo stepwise up-shift control are performed at the same time, and when this condition is satisfied, performing the ramp control at a rapid increase rate that is greater than the normal increase rate; and in a case where although the pseudo stepwise up-shift control is completed, the engagement control of the lock-up clutch is not completed yet, continuing the engagement control with an increase rate returned from the rapid increase rate to the normal increase rate.

* * * * *